United States Patent Office 3,109,731
Patented Nov. 5, 1963

3,109,731
PRODUCTION OF ACTINIDE METAL
James B. Knighton, Joliet, Ill., assignor to the United States of America as represented by the United States Atomic Energy Commission
No Drawing. Filed Dec. 19, 1961, Ser. No. 160,675
13 Claims. (Cl. 75—84.1)

This invention deals with the production of actinide metals from oxides by the reduction with magnesium metal in a molten medium or flux containing predominantly metal chlorides.

It is an object of this invention to provide a process for the reduction of actinide metal oxides that proceeds at a very fast rate.

It is another object of this invention to provide a process for the reduction of actinide metal oxides by which a metal of a bright luster and high degree of purity is obtained.

It is still another object of this invention to provide a process for the production of actinide metal from oxide which can be carried out at atmospheric pressure in a normal atmosphere of air and at relatively low temperature, so that the equipment for the process can be very simple.

It is finally also an object of this invention to provide a process for the reduction of actinide oxides with magnesium metal wherein magnesium oxide, which is formed in the reaction, is dissolved in a salt and easily separated from the metal formed.

It has been ascertained that in a process of the type with which this invention is concerned, the composition of the flux has a great bearing on the efficiency. For instance, it was discovered that a relatively small amount of fluoride, in particular of magnesium fluoride, should preferably be present in the flux; it prevents the metal from becoming dispersed and trapped as droplets in the salt, thus causes the formation of an especially clean interface and facilitates and improves the separation of the metal and salt phases after reduction with magnesium; this also results in a higher yield. It was furthermore determined during the investigation carried out by the inventor that a flux consisting of 95 mole percent of calcium chloride and 5 mole percent of magnesium fluoride or calcium fluoride causes the reduction to proceed at a very slow rate. In contradistinction thereto, a mixture of 95 mole percent of magnesium chloride and 5 mole percent of magnesium fluoride was found to be excellently suitable, because the reaction rate in this medium was very fast and the oxide was fully reduced in a matter of minutes. However, this composition has the drawback that it requires relatively high temperatures.

It was then unexpected and very surprising when it was found that, although calcium chloride plus magnesium fluoride brings about slow reduction, mixtures of calcium chloride with magnesium chloride plus a small quantity of magnesium fluoride result in a reduction reaction with magnesium which proceeds just as fast as with the magnesium chloride-magnesium fluoride mixture; the otherwise disadvantageous influence of the calcium chloride thus does not exist when it is used in combination with magnesium chloride. It was also found that a combination of magnesium chloride with lithium chloride, strontium chloride, sodium chloride, barium chloride or potassium chloride can be used with similarly satisfactory results.

In the following Table I, the degreee of reduction and the time in which this reduction of at least 98% was obtained are juxtaposed for fluxes consisting of 5 mole percent of magnesium fluoride, 47.5 mole percent of magnesium chloride and 47.5 mole percent of one of the cholorides listed above as operative.

TABLE I

| Additional chloride | Time, minutes | Percent reduction |
|---|---|---|
| LiCl | 10 | 100 |
| SrCl₂ | 10 | 99 |
| CaCl₂ | 15 | 99 |
| NaCl | 20 | 99 |
| BaCl₂ | 20 | 99 |
| KCl | 30 | 98 |

It is obvious from Table I that lithium and strontium are the most effective "additional chlorides"; however, calcium chloride, being less expensive than lithium or strontium chloride, having a lower melting point than the latter and not being as hygroscopic as lithium chloride, is the preferred of the "additional chlorides" listed.

It was finally also determined that an alkaline earth metal chloride must be present in the flux, since alkali metal chlorides alone with magnesium chloride do not result in nearly as fast a reduction as do the fluxes containing alkaline earth metal chlorides. This will be shown later in Example I.

The process of this invention thus broadly comprises mixing at above 600° C. an actinide oxide with a flux consisting of about 5 mole percent of magnesium fluoride and about 95 mole percent of a mixture of magnesium choloride in a quantity to yield a total of at least 14 mole percent of magnesium cation, the balance being calcium chloride, lithium chloride, strontium chloride, barium chloride, sodium chloride or potassium chloride either in an ambient atmosphere of air or in one of inert gas, adding magnesium metal to the mixture, agitating the mixture whereby actinide oxide is reduced to actinide metal and the actinide metal is taken up by the magnesium, separating a metal phase containing the actinide from hte salt phase, and heating the metal phase for the volatilization of the magnesium. The actinide oxide can also be added to the flux-alloy mixture at operating temperature. Air, of course, is preferred to an inert atmosphere.

As the metal oxide, uranium dioxide, $U_3O_8$, plutonium dioxide and thorium dioxide were found suitable. These oxides are preferably used in comminuted form.

The composition of the chlorides can vary widely. It is, however, limited by the criticality of the requirement that the total $Mg^{++}$ content be at least 14 mole percent. For $U_3O_8$ the reduction rate was found to increase radically with $Mg^{++}$ concentrations higher than 14 mole percent, and for $ThO_2$ the corresponding critical value was about 30 mole percent. Magnesium fluoride was used in quantities of between 5 mole percent and 20 mole percent. The preferred quantity of magnesium fluoride is approximately 5%, and about 47.5% each of magnesium chloride and the "additional chloride" was found satisfactory. Another composition that proved adequate, for instance, is that containing 5 mole percent of magnesium fluoride, 41 mole percent of magnesium chloride and 54 mole percent of sodium chloride.

The magnesium is best incorporated in the form of a zinc alloy. It was found that the magnesium content of the zinc alloy can vary from 1 to 50% by weight, but preferably is between 1 and 15%; the amount of zinc should be such that the density of the alloy is greater than that of the flux. A content of about 5% by weight is the most desirable concentration.

The quantities of the flux should be adjusted so that it does not contain more than 11 w/o of magnesium oxide after complete reduction of the actinide oxide, higher concentrations impairing markedly the rate of reduction.

The temperature is dependent to a certain degree on the composition and the melting point of the flux. For calcium chloride-magnesium chloride-magnesium fluoride fluxes, for instance, a minimum of about 650° C. is adequate, while in the case of lithium chloride-magnesium chloride-magnesium fluoride the temperature can be as low as 600° C. Broadly, the temperature may range between 600 and 900° C., but a temperature of from 700 to 800° C. is preferred. The agitation of the mixture is very important for a satisfactory operation of the process.

After completed reduction, the metal and salt phases are separated from each other. This can be done by means known to those skilled in the art, for example by decantation or mechanical separation after solidification of both phases. The zinc and magnesium are removed from the actinide metal by distillation.

In the following, a few examples are given to illustrate the process of this invention.

*Example I*

Twenty runs were carried out, in each of which 200 grams of a flux mixture were charged into an alumina crucible; 400 grams of zinc containing 5% by weight of magnesium were also added. Uranium oxide, $U_3O_8$, was then introduced in a quantity to yield, at complete reduction, a 1% uranium alloy. (This concentration was chosen to make a calculation of the degree of reduction possible.) The mixture was heated to 750° C. and stirred at 800 r.p.m. with a quartz stirring rod. The atmosphere was air at the prevailing pressure. The metal phases were analyzed after certain intervals for their uranium contents and the degree of reduction obtained was calculated from these analytical data. The conditions of each run and the results are compiled in Table II.

ing temperature was 750° C., and agitation was carried out at 400 r.p.m. for two hours.

Filtered samples of the metal phase were taken every 30 minutes and analyzed as to their plutonium content. Likewise, the flux was analyzed at the end of the two hours. The results are summarized in Table III.

TABLE III

| Time (min.) | Pu content w/o |
| --- | --- |
| Metal phase: | |
| 30 | 0.57 |
| 60 | 0.52 |
| 90 | 0.52 |
| 120 | 0.53 |
| Flux: | |
| 120 | 0.0084 |

It is obvious that the reduction was essentially quantitative after the first 30 minutes and that the plutonium content approximately, within analytical errors, remained constant in the metal phase for the rest of the run. The flux analysis showed that the reduction was at least 99.8% complete at the end of the run.

The metal and flux after the run were poured into a graphite mold and allowed to solidify. They could then be easily removed from the mold and separated from each other with a very clean interface.

*Example III*

Two hundred grams of a mixture containing 47.5 mole percent of lithium chloride, 47.5 mole percent of magnesium chloride and 5 mole percent of magnesium fluoride

TABLE II

| Run No. | Flux composition | | | Percent Reduction after period indicated, minutes | | | | |
| --- | --- | --- | --- | --- | --- | --- | --- | --- |
| | 47.5 m/o | 47.5 m/o | 5 m/o | 10 | 20 | 30 | 60 | 120 |
| 1 | LiCl | $MgCl_2$ | $MgF_2$ | 99.9+ | 99.9+ | 99.9+ | 99.9+ | 99.9+ |
| 2 | NaCl | $MgCl_2$ | $MgF_2$ | 86.0 | 99.4 | 99.4 | 99.4 | 99.4 |
| 3 | KCl | $MgCl_2$ | $MgF_2$ | 70.5 | 90.9 | 97.8 | 97.0 | 98.0 |
| 4 | LiCl | $CaCl_2$ | $MgF_2$ | 26.7 | 44.0 | 56.0 | 86.0 | 99.8 |
| 5 | NaCl | $CaCl_2$ | $MgF_2$ | 23.6 | 30.8 | 39.4 | 60.0 | 84.0 |
| 6 | KCl | $CaCl_2$ | $MgF_2$ | 13.6 | 18.0 | 21.4 | 31.3 | 41.0 |
| 7 | LiCl | $SrCl_2$ | $MgF_2$ | 18.5 | 35.8 | 47.4 | 66.6 | 88.8 |
| 8 | NaCl | $SrCl_2$ | $MgF_2$ | 8.0 | 13.0 | 20.8 | 40.2 | 70.3 |
| 9 | KCl | $SrCl_2$ | $MgF_2$ | 1.3 | 2.4 | 2.9 | 6.4 | 11.6 |
| 10 | LiCl | $BaCl_2$ | $MgF_2$ | 12.5 | 21.6 | 26.0 | 52.0 | 85.0 |
| 11 | NaCl | $BaCl_2$ | $MgF_2$ | 12.5 | 19.9 | 27.3 | 31.3 | 44.6 |
| 12 | KCl | $BaCl_2$ | $MgF_2$ | 1.7 | 1.7 | 3.8 | 3.2 | 6.4 |
| 13 | LiCl | NaCl | $MgF_2$ | 5.7 | 9.0 | 8.8 | 13.3 | 23.4 |
| 14 | LiCl | KCl | $MgF_2$ | 4.0 | 3.0 | 3.0 | 6.0 | 7.0 |
| 15 | KCl | NaCl | $MgF_2$ | 2.1 | 3.0 | 3.0 | 6.0 | 12.8 |
| 16 | $CaCl_2$ | $MgCl_2$ | $MgF_2$ | 97.0 | 99.+ | 99.+ | 99.+ | 99.+ |
| 17 | $SrCl_2$ | $MgCl_2$ | $MgF_2$ | 99.0 | 99.0 | 99.0 | 99.0 | 99.0 |
| 18 | $BaCl_2$ | $MgCl_2$ | $MgF_2$ | 92.0 | 99.6+ | 99.6+ | 99.6+ | 99.6+ |
| 19 | LiCl | LiCl | LiF | 10.0 | 11.0 | 12.0 | 17.0 | 23.1 |
| 20 | $MgCl_2$ | $MgCl_2$ | $MgF_2$ | 97.5 | 99.9+ | 99.9+ | 99.9+ | 99.9+ |

The above results clearly show that magnesium chloride is an essential component of the flux for fast reduction. They also indicate that a mixture of alkali metal chloride and alkaline earth metal chloride, not considering the essential magnesium chloride as alkaline earth metal chloride, does not bring about the desired fast reduction. The lithium and strontium chlorides, when admixed with magnesium chloride and magnesium fluoride, proved best, since they yielded a 99% or higher reduction within 10 minutes.

*Example II*

Plutonium dioxide was introduced into a tantalum crucible together with a zinc alloy containing 5% of magnesium. The quantity of the plutonium dioxide was adjusted so that the zinc-magnesium alloy obtained after complete reduction was to contain 0.54 w/o of plutonium. The flux used consisted of 47.5 mole percent of calcium chloride, 47.5 mole percent of magnesium chloride and 5 mole percent of magnesium fluoride. The operatwere introduced into an alumina crucible, and 380 grams of zinc plus 20 grams of magnesium were added thereto. The mixture was heated to about 750° C. while in contact with air, and 4.5 grams of thorium dioxide were added. The reaction mass was stirred with a quartz rod at 800 r.p.m. Samples of the metal phase were taken at various intervals to determine the degree of the thorium oxide reduction to the metal. The results were as follows. After 10 minutes the reduction was 26.4%; after 20 minutes 45.3%; after 30 minutes 55.6%; after one hour 80%; and after two hours 99%.

The process of this invention is applicable to the production of actinide metals from their oxides, but it is also suitable for reprocessing fuel.

It will be understood that invention is not to be limited by the details given herein but that it may be modified within the scope of the appended claims.

What is claimed is:

1. A process of producing actinide metal by reducing actinide oxide with magnesium, comprising adding to the actinide oxide a flux consisting of about 5 mole percent of magnesium fluoride and 95 mole percent of a chloride mixture consisting of magnesium chloride and a chloride selected from the group consisting of lithium chloride, sodium chloride, potassium chloride, calcium chloride, strontium chloride and barium chloride, the total $Mg^{++}$ content of the flux being at least 14 mole percent; adding a binary zinc-magnesium alloy; heating the reaction mixture to at least 600° C. while in contact with the ambient atmosphere of air; agitating the reaction mixture, whereby actinide oxide is reduced to the actinide metal, the actinide metal is taken up by the alloy and magnesium oxide is formed and taken up by the flux; separating the actinide-containing alloy from the flux; and heating the alloy for volatilization of the zinc and magnesium.

2. The process of claim 1 wherein the flux is added in a quantity to reach a maximum magnesium oxide content of 11% by weight upon complete reduction.

3. The process of claim 2 wherein the zinc-magnesium alloy contains from 1 to 50% by weight of magnesium.

4. The process of claim 3 wherein the magnesium content of the alloy ranges between 1 and 15% by weight.

5. The process of claim 4 wherein the magnesium content of the alloy is about 5% by weight.

6. The process of claim 2 wherein the reaction temperature is between 600 and 900° C.

7. The process of claim 6 wherein the temperature is between 700 and 800° C.

8. The process of claim 2 wherein the actinide oxide is used in comminuted form.

9. The process of claim 2 wherein the chloride mixture is an equimolar mixture.

10. The process of claim 2 wherein the actinide oxide is $U_3O_8$.

11. The process of claim 2 wherein the actinide oxide is $UO_2$.

12. The process of claim 2 wherein the actinide oxide is $PuO_2$.

13. The process of claim 2 wherein the actinide oxide is thorium dioxide and the flux contains a minimum amount of magnesium cation of 30 mole percent.

References Cited in the file of this patent

UNITED STATES PATENTS

| | | |
|---|---|---|
| 1,602,542 | Marden | Oct. 12, 1926 |
| 1,659,209 | Marden | Feb. 14, 1928 |
| 2,849,308 | Foote | Aug. 26, 1958 |

OTHER REFERENCES

Metallurgy and Fuels, by Finniston and Howe, September 1956, Pergamon Press, pp. 28–32.